(12) United States Patent
Betz et al.

(10) Patent No.: US 8,820,794 B1
(45) Date of Patent: Sep. 2, 2014

(54) HOSE-IN-HOSE COUPLER

(76) Inventors: James C. Betz, South Bend, IN (US); Geoffrey A. Barnes, Kennewick, WA (US)

( * ) Notice: Subject to any disclaimer, the term of this patent is extended or adjusted under 35 U.S.C. 154(b) by 61 days.

(21) Appl. No.: 13/541,835

(22) Filed: Jul. 5, 2012

(51) Int. Cl.
*F16L 17/00* (2006.01)

(52) U.S. Cl.
USPC .................................. 285/123.6; 285/123.15

(58) Field of Classification Search
CPC .............. F16L 39/005; F16L 7/02; F16L 9/18
USPC ......... 285/123.3, 123.12, 41, 123.15, 123.14, 285/123.6
See application file for complete search history.

(56) References Cited

U.S. PATENT DOCUMENTS

| | | | |
|---|---|---|---|
| 3,068,026 A | 12/1962 | McKamey | |
| 4,922,971 A | 5/1990 | Grantham | |
| 5,265,652 A | 11/1993 | Brunella | |
| 5,913,336 A | 6/1999 | Ingram | |
| 6,682,102 B1 | 1/2004 | Betz | |
| 8,074,687 B2 | 12/2011 | Queau et al. | |
| 2003/0178842 A1* | 9/2003 | Gallagher | ................ 285/123.15 |

FOREIGN PATENT DOCUMENTS

EP  1731823  12/2006

* cited by examiner

*Primary Examiner* — Aaron Dunwoody
(74) *Attorney, Agent, or Firm* — Botkin & Hall, LLP

(57) ABSTRACT

A hose-in-hose system defined by a first inner hose assembly, a second inner hose assembly, a first outer hose assembly and a second outer hose assembly. The first inner hose assembly is carried within the first outer hose assembly. The second inner hose assembly is carried within the second outer hose assembly. A first spacer member is nested between the first inner hose assembly and the first outer hose assembly. A second spacer member is nested between the second inner hose assembly and the second outer hose assembly. Said first outer hose assembly is mateable to said second outer hose assembly such that said first inner hose assembly is held in mated contact with said second inner hose assembly.

6 Claims, 11 Drawing Sheets

HOSE-IN-HOSE COUPLER

BACKGROUND OF THE INVENTION

Hose-in-hose coupler configurations are used in a variety of industries for the transport of fluids. For example, the nuclear energy industry frequently uses hose-in-hose configurations to transport waste fluids.

Hose-in-hose configurations typically include an inner hose assembly and an outer hose assembly. The inner hose assembly includes an inner hose having an inner coupler fixed to each end of the inner hose. The outer hose assembly includes an outer hose having an outer coupler fixed to each end of the outer hose. The inner hose assembly is carried within the outer hose assembly such that a containment area is formed in the space between the inner hose assembly and the outer hose assembly. If the inner hose assembly ruptures, or otherwise fails, any fluid escaping from the inner hose will be contained within the containment area. Thus, the containment area serves as an overflow reservoir to capture fluid escaping from the inner hose rather than expelling it to the surrounding area or to the environment.

Hose-in-hose configurations frequently have a large diameter, making manual manipulation of the hose assemblies during attachment and detachment difficult. Previous hose-in-hose configurations use threaded or similar connectors which require manual manipulation of fasteners during assembly and disassembly which can be cumbersome to manipulate due to the large size of the hoses. Hose-in-hose configurations can be cumbersome to assemble during initial assembly due to the complexity of the fasteners. Also, in the case of a rupture where a hose needs to be replaced, a coupling configuration capable of rapid disassembly and reassembly is desired. Additionally, previous hose-in-hose couplers were subject to movement or sliding of the inner hose assembly relative to the outer hose assembly, making assembly and disassembly difficult, and making it difficult to ensure the outer and inner hose assemblies are properly aligned following assembly.

As such, an improved hose-in-hose coupler is needed to overcome these and other failings of the prior art.

SUMMARY OF THE INVENTION

The present disclosure describes a hose-in-hose coupler configuration which includes an inner hose assembly and an outer hose assembly. The inner hose assembly is formed from one or more inner hose connectors. Each inner hose assembly includes an inner hose having a first inner hose connector fixed to one end and a second first inner hose connector fixed to the other end of the inner hose. The outer hose assembly is formed from one or more outer hose connectors. Each outer hose assembly includes an outer hose having a first outer hose connector fixed to one end and a second outer hose connector fixed to the other end of the outer hose. The first inner hose connector of one inner hose assembly may be coupled to the second inner hose connector of another inner hose assembly; likewise, the first outer hose connector of one outer hose assembly may be coupled to the second outer hose connector of another outer hose assembly. In this way, a series of assemblies may be joined together to form a hose assembly. The inner hose assembly is carried within the outer hose assembly. The inner hose assembly carries a fluid, and this fluid is kept isolated from the outer hose assembly. A containment area is formed as an annular channel between the inner hose assembly and the outer hose assembly. The containment area collects fluid expelled from the inner hose assembly in the case of a failure of the inner hose assembly. A spacer member nests between the inner hose assembly and the outer hose assembly. The spacer member fixes the axial and radial position of the inner hose assembly relative to the outer hose assembly.

BRIEF DESCRIPTION OF THE DRAWINGS

A preferred embodiment of this invention has been chosen wherein.

DESCRIPTION OF THE PREFERRED EMBODIMENT

Figure 1:
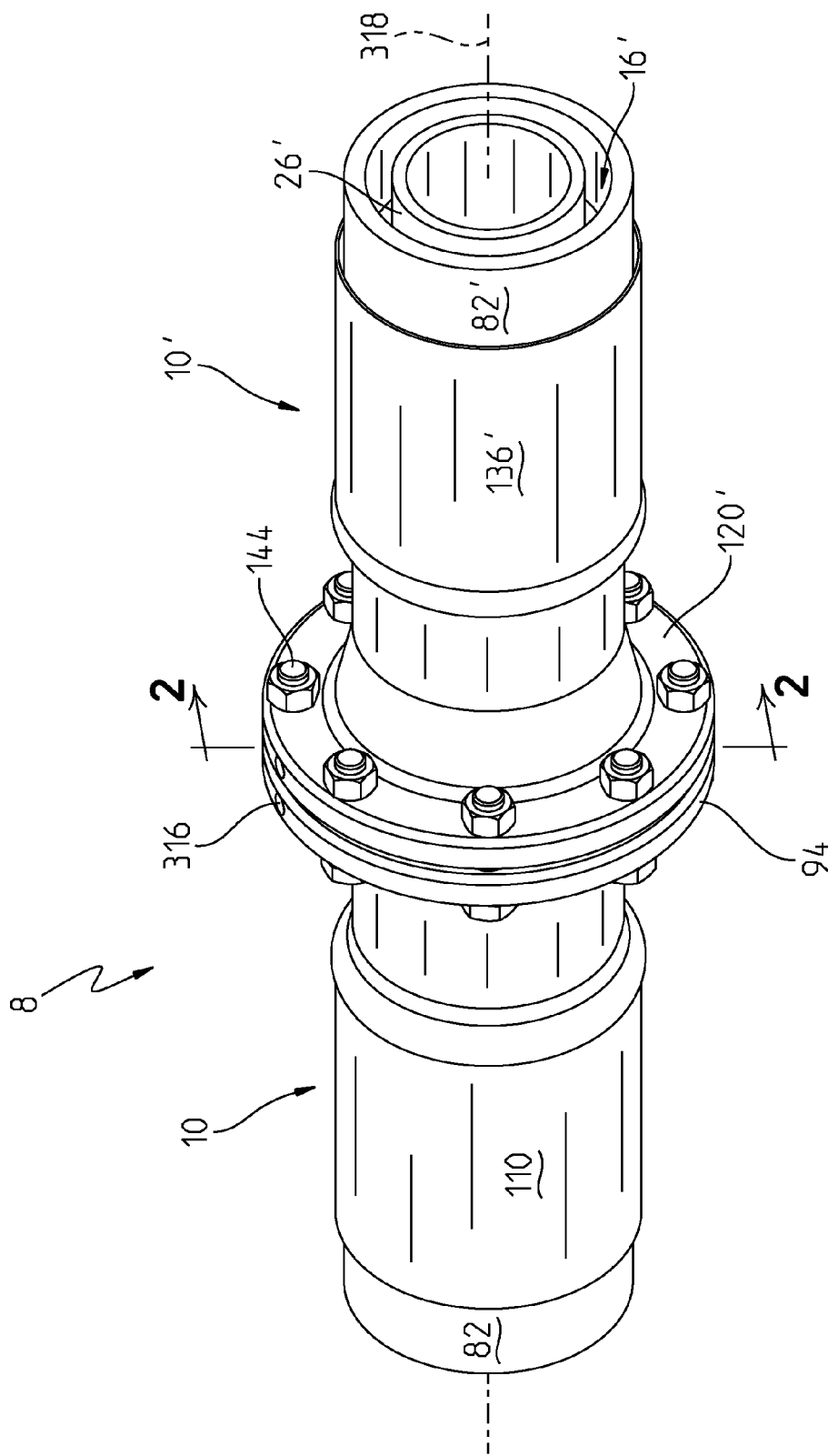
FIG. 1 is a perspective view of two hose-in-hose assemblies joined together at a flange.

The present disclosure describes a hose-in-hose system 8 which is formed from a series of hose-in-hose segments 10. Each hose-in-hose segment 10 is formed having an inner hose assembly 12 carried within an outer hose assembly 14. A containment area 16 is an annular region formed between inner hose assembly 12 and outer hose assembly 14. A first hose-in-hose segment 10 is mateable with a second hose-in-hose segment 10' to form hose-in-hose system 8. Any number of hose-in-hose segments 10 are joinable in series to form a hose-in-hose system 8 of desired length.

As described herein, each hose-in-hose segment 10 includes comparable individual components. When describing the components of a single segment 10, standard Arabic numbers will be used, such as: "first inner hose connector 18". Standard Arabic numbers followed by a single quotation mark, or prime, will be used for those components which relate to a second segment 10', such as: "first inner hose connector 18 of first hose-in-hose segment 10 mates with second inner hose connector 20' of second hose-in-hose segment 10'."

Figure 9:
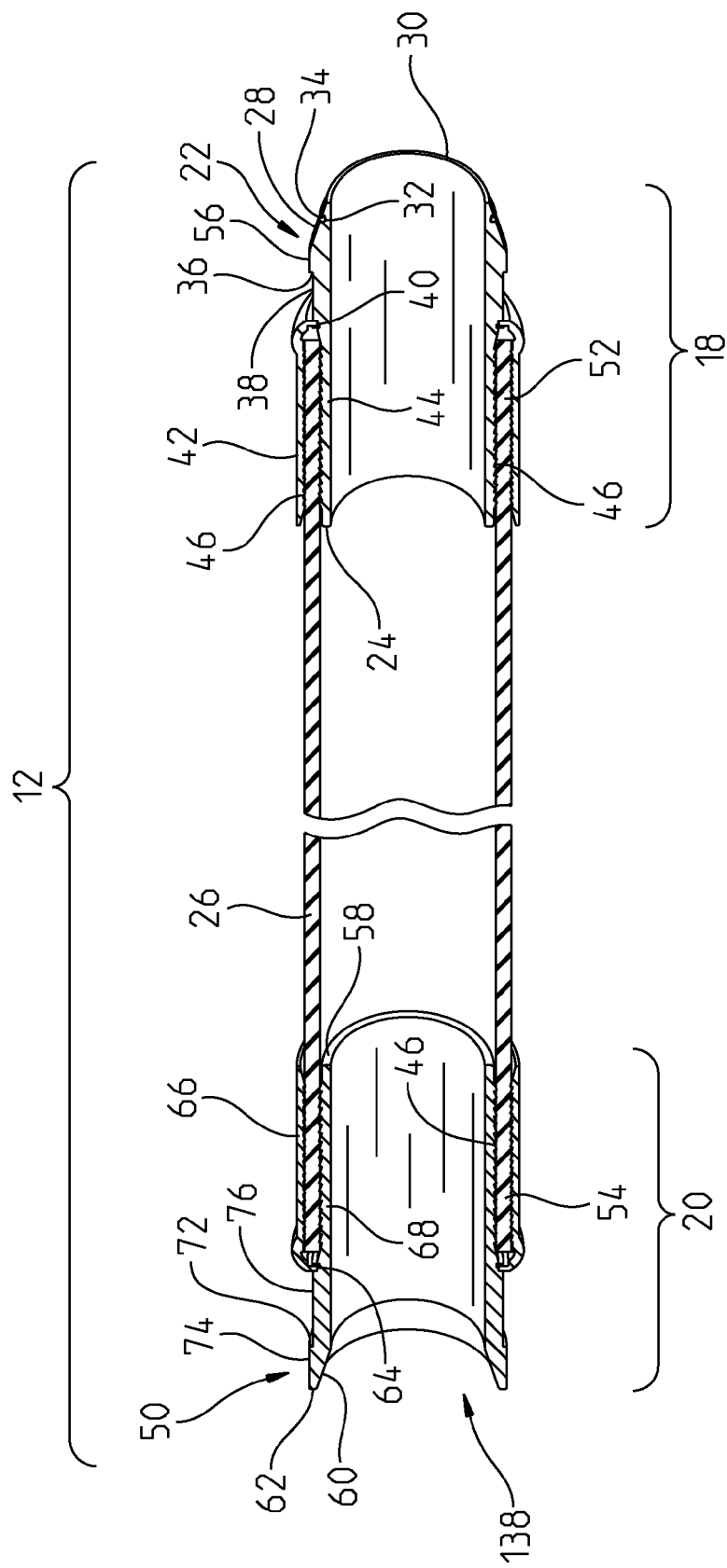
FIG. 9 is a cross-sectional side view of the inner hose assembly.

Inner hose assembly 12 is formed from a first inner hose connector 18, a second inner hose connector 20, and a first inner hose 26 joining first inner hose connector 18 and second inner hose connector 20, as shown in FIG. 9. First inner hose connector 18, second inner hose connector 20 and inner hose 26 are tubular in nature and define an inner chamber 138 of inner hose assembly 12. Inner chamber 138 is generally hollow and suitable for transporting a fluid through inner hose assembly 12. In the embodiment shown in FIG. 9, first inner hose connector 18 includes a first male coupler 22 and a collar 42. First male coupler 22 is a generally cylindrical member extending the length of first inner hose connector 18 between two ends: a terminal end 30 and a ferruled end 24. Beginning at terminal end 30, first male coupler 22 is defined by a tapered outer surface 28 which extends from terminal end 30 to a flat portion 56. Tapered outer surface 28 includes a minimum outer diameter at terminal end 30 and increases in diameter to flat portion 56. Tapered outer surface 28 of first male coupler 22 includes an inner groove 32 circumscribing tapered outer surface 28. Inner groove 32 carries an O-ring 34. Flat portion 56 has a substantially uniform outer diameter which circumscribes first male coupler 22. Flat portion 56 extends from tapered outer surface 28 to a shoulder 36. Shoulder 36 defines a stepped change of the outer diameter of first male coupler 22. Shoulder 36 extends perpendicularly relative to the central axis 318 of first male coupler 22 and circumscribes first male coupler 22. Shoulder 36 extends between flat portion 56 and a recess 38. Recess 38 is defined on one end by shoulder 36 and on the end by a notch 40. Recess 38 is annular and has substantially the same outer diameter between shoulder 36 and notch 40. Notch 40 is an annular recess or groove circumscribing first male coupler 22. A sleeve portion 44 extends from notch 40 to ferruled end 24. Thereby, first male coupler 22 is defined on one end by terminal end 30 and on the other end by ferruled end 24. Sleeve portion 44 of first male coupler 22 is adapted for fitting within inner chamber 138 of a first end 52 of inner hose 26. Notch 40 is adapted for receiving collar 42. Collar 42 is cylindrically shaped and is adapted for being crimped over sleeve portion 44 of the first male coupler 22. Sleeve portion 44 and collar 42 each have redundant annular ferrules 46 for gripping a first end 52 of inner hose 26. Inner hose 26 is made of a flexible material that can be any one of many materials that will adequately contain fluids to be transported along its inner chamber 138. The material of the inner hose 26 must be one that can be retained by the ferrules 46 of sleeve portion 44 and collar 42. Once collar 42 is crimped onto first male coupler 22 at notch 40, it will permanently retain first end 52 of inner hose 26 to first inner hose connector 18.

In the embodiment shown in FIG. 9, second inner hose connector 20 includes a first female coupler 50 and a collar 66. First female coupler 50 is a generally cylindrical member extending the length of second inner hose connector 20 between two ends: a terminal end 62 and a ferruled end 58. Beginning at terminal end 62, first female coupler 50 includes a tapered inner surface 60 which is formed facing inner chamber 138 and extends from terminal end 62 toward ferruled end 58. Tapered inner surface 60 of first female coupler 50 is shaped to mate with tapered outer surface 28 of first male coupler 22, such that a fluid-tight seal is formed therebetween, such seal aided by contact between O-ring 34 and tapered inner surface 60. Tapered inner surface 60 includes a maximum outer diameter at terminal end 62 and decreases in diameter in the direction of ferruled end 58. A flat portion 74 has a substantially uniform outer diameter which circumscribes first female coupler 50 and extends from terminal end 62 to a shoulder 72. Shoulder 72 defines a stepped change of the outer diameter of first female coupler 50. Shoulder 72 extends perpendicularly relative to the central axis 318 (as shown on FIG. 1) of first female coupler 50 and circumscribes first female coupler 50. Shoulder 72 extends between flat portion 74 and a recess 76. Recess 76 is defined on one end by shoulder 72 and on the end by a notch 64. Recess 76 is annular and has substantially the same outer diameter between shoulder 72 and notch 64. Notch 64 is an annular recess or groove circumscribing first female coupler 50. A sleeve portion 68 extends from notch 64 to ferruled end 58. Thereby, first female coupler 50 is defined on one end by terminal end 62 and on the other end by ferruled end 58. Sleeve portion 68 of first female coupler 50 is adapted for fitting within an inner chamber 138 of a second end 54 of inner hose 26. Notch 64 is adapted for receiving collar 66. Collar 66 is cylindrically shaped and is adapted for being crimped over sleeve portion 68 of the first female coupler 50. Sleeve portion 68 and collar 66 each have redundant annular ferrules 46 for gripping a second end 54 of inner hose 26. Once collar 66 is crimped onto first female coupler 50 at notch 64, it will permanently retain second end 54 of inner hose 26 to second inner hose connector 20.

Figure 10:
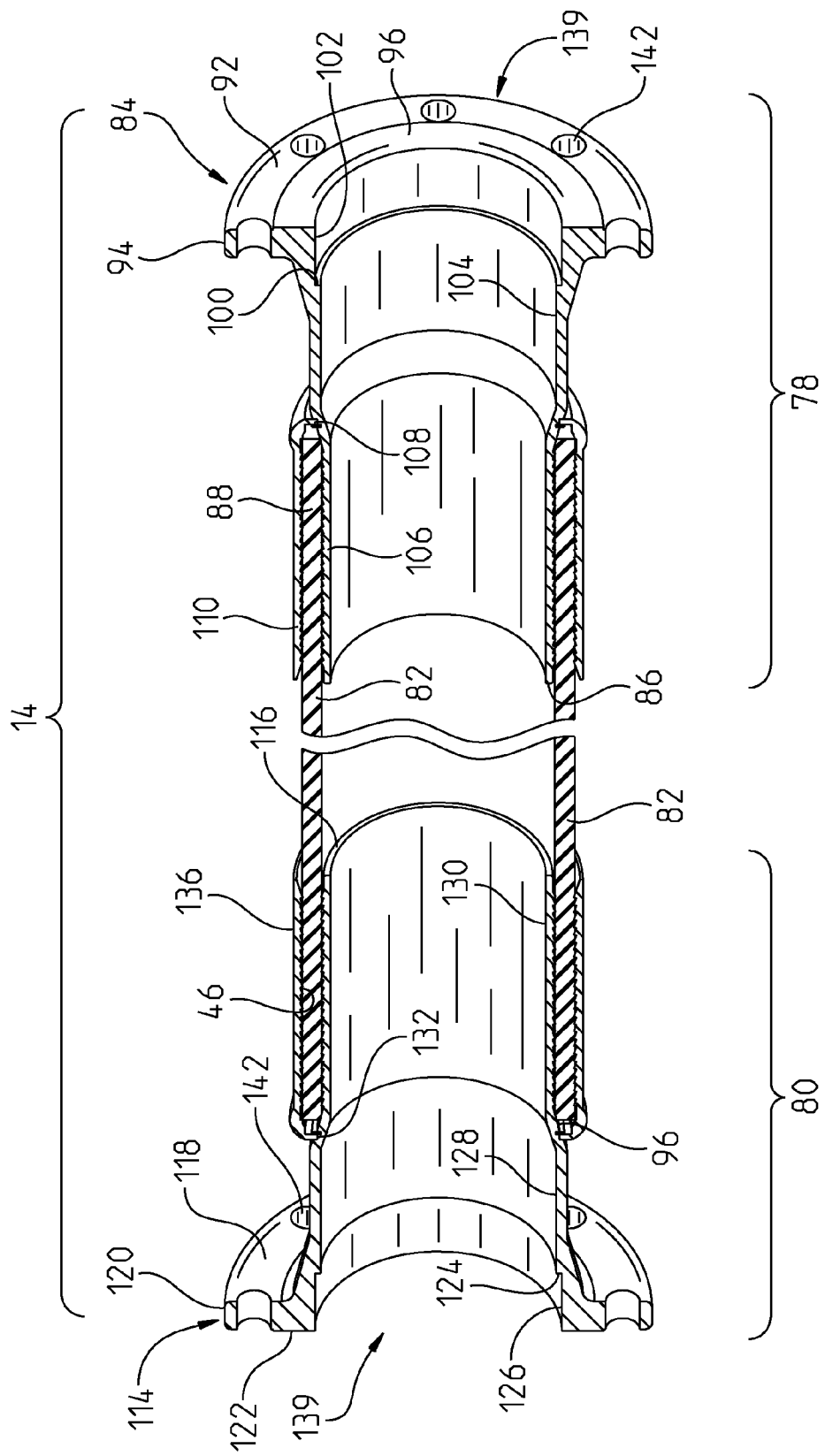
FIG. 10 is a cross-sectional side view of the outer hose assembly.

Outer hose assembly 14 is formed from a first outer hose connector 78, a second outer hose connector 80, and a first outer hose 82 joining first outer hose connector 78 and second outer hose connector 80, as shown in FIG. 10. First outer hose connector 78, second outer hose connector 80 and outer hose 82 are tubular in nature and define an inner chamber 139 of outer hose assembly 14. Inner chamber 139 is generally hollow and suitable for transporting a fluid through outer hose assembly 14. In the embodiment shown in FIG. 10, first outer hose connector 78 includes a first outer coupler 84 and a collar 110. First outer coupler 84 is a generally cylindrical member extending the length of first outer hose connector 78 between two ends: a mating surface 92 and a ferruled end 86. Beginning at mating surface 92, first outer coupler 84 is defined by a substantially planar mating surface 92 which is defined by a flange 94 extending perpendicularly from first outer coupler 84 relative a central axis 318 (as shown on FIG. 1) through outer hose assembly 14. Mating surface 92 of first outer coupler 84 may include a ring-shaped recess 96 suitable for accepting a gasket 98. A series of apertures 142 pierce mating surface 92 proximate the outer edge of flange 94 for accepting fasteners 144. A bore 102 extends from mating surface 92 to a shoulder 100 which together define a portion of inner chamber 139. Bore 102 has a substantially uniform inner diameter. Shoulder 100 defines a stepped change of the inner diameter of first outer hose connecter 78 and extends between bore 102 and a spanning portion 104. Shoulder 100 extends perpendicularly toward a central axis 318 through first outer hose connector 78. Spanning portion 104 has a substantially uniform inner diameter and extends between shoulder 100 and a sleeve portion 106. Sleeve portion 106 extends from spanning portion 104 on one end to ferruled end 86 on the other end. Thereby first outer coupler 84 is defined on one end by mating surface 92 and on the other end by ferruled end 86. Sleeve portion 106 of first outer coupler 84 is adapted for fitting within an interior 112 of a first end 88 of outer hose 82. A notch 108 is formed in the outer surface of first outer coupler 84. Notch 108 is an annular recess or groove circumscribing first outer coupler 84 and is positioned on the outer surface of first outer coupler 84 near where sleeve portion 106 joins spanning portion 104. Notch 108 is adapted for receiving collar 110. Collar 110 is adapted for being crimped over sleeve portion 106 of first outer coupler 84. Sleeve portion 106 and collar 110 each have redundant annular ferrules 46 for gripping first end 88 of outer hose 82. Outer hose 82 typically has similar characteristics of inner hose 26 such that outer hose 82 is restrainable by annular ferrules 46 and is suitable for carrying fluids. Once collar 110 is crimped onto first outer coupler 84 at notch 108, collar 110 will permanently retain first end 88 of outer hose 82 to first outer hose connector 78.

In the embodiment shown in FIG. 10, second outer hose connector 80 includes a second outer coupler 114 and a collar 136. Second outer coupler 114 is a generally cylindrical member extending the length of second outer hose connector 80 between two ends: a mating surface 118 and a ferruled end 116. Beginning at mating surface 118, second outer coupler 114 is defined by a substantially planar mating surface 118 which is defined by a flange 120 extending perpendicularly from second outer coupler 114 relative a central axis 318 through outer hose assembly 14. Mating surface 118 of second outer coupler 114 may include a ring-shaped extension 122 suitable for mating with gasket 98. Mating surface 92 of first outer coupler 84 of a first hose-in-hose segment 10, mating surface 118' of second outer coupler 114' of a second hose-in-hose segment 10' and gasket 98 are mateable one with another and together form a fluid-tight between a first hose-in-hose segement 10 and a second hose-in-hose segment 10'. A series of apertures 142 pierce mating surface 118 proximate the outer edge of flange 120 for accepting fasteners 144. A bore 126 extends from mating surface 118 to a shoulder 124 which together define a portion of inner chamber 139. Bore 126 has a substantially uniform inner diameter. Shoulder 124 defines a stepped change of the inner diameter of second outer hose connector 80 and extends between bore 126 and a spanning portion 128. Shoulder 124 extends perpendicularly to a central axis 318 through second outer hose connector 80. Spanning portion 128 has a substantially uniform inner diameter and extends between shoulder 124 and a sleeve portion 130. Sleeve portion 130 extends from spanning portion 128 on one end to ferruled end 116 on the other end. Thereby second outer coupler 114 is defined on one end by mating surface 118 and on the other end by ferruled end 116. Sleeve portion 130 of second outer coupler 114 is adapted for fitting within an interior 112 of a second end 90 of outer hose 82. A notch 132 is formed in the outer surface of second outer coupler 114. Notch 132 is an annular recess or groove circumscribing second outer coupler 114 and is positioned on the outer surface of second outer coupler 114 near where sleeve portion 130 joins spanning portion 128. Notch 132 is adapted for receiving collar 136. Collar 136 is adapted for being crimped over sleeve portion 130 of second outer coupler 114. Sleeve portion 130 and collar 136 each have redundant annular ferrules 46 for gripping second end 90 of outer hose 82. Once collar 136 is crimped onto second outer coupler 114 at notch 132, collar 136 will permanently retain second end 90 of outer hose 82 to second outer hose connector 80.

In the preferred embodiment, inner hose assembly 12 and outer hose assembly 14 each have a circular cross section when sliced along a plane perpendicular to the annular length of the hose assembly. It should be appreciated by one skilled in the art that the cross section could have a polygonal or other shape within the scope of this disclosure. For simplicity, the present disclosure describes many parts as having circular (or annular) cross-sections, but such description should not be read to limit the scope of the invention.

Inner hose assembly 12 is carried within inner chamber 139 of outer hose assembly 14. Containment area 16 is formed in the space between the inner hose assembly 12 and outer hose assembly 14. Containment area 16 is an annular channel which circumscribes inner hose assembly 12 and is suitable for carrying a fluid. Containment area 16 is interrupted by one or more spacer members 148', 150. Spacer members 148', 150 are ring-shaped and nest in containment area 16 and serve to orient inner hose assembly 12 at a fixed location within outer hose assembly 14. Spacer members 148', 150 brace inner hose assembly 12 against annular and radial movement within outer hose assembly 14. Spacer member 148' is a circular ring formed as a single piece of durable and corrosion-resistant material, such as metal. Split spacer member 150 is a circular ring formed from two semicircular halves 152, 154, as shown in FIG. 8, from a similar material as spacer member 148'.

Spacer member 148' is ring-shaped as defined by a first face 156' and a second face 158' separated by an outer rim 160' and an inner rim 162'. Spacer member 148' circumscribes first female coupler 50' with inner rim 162' contacting recess 76' of coupler 50' and with first face 156' abutting shoulder 72' of coupler 50'. Bore 126' of second outer coupler 114 contacts spacer member 148' at outer rim 160' with second face 158' of the solid spacer member abutting shoulder 124' of the second outer coupler. In this way solid spacer member 148' restricts axial movement of second inner hose connector 20 relative second outer hose connector 80 at least by contacting recess 76' of first female coupler 50' and by contacting bore 126' of second outer coupler 114. Similarly, spacer member 148' restricts radial movement of second inner hose connector 20 relative second outer hose connector 80 at least by contacting shoulder 72' of first female coupler 50' and by contacting shoulder 124' of second outer coupler 114. As will be better appreciated in light of disclosure below, radial movement of second inner coupler 20 is also restricted by contact between female tapered surface 60 of a first hose segment 10 and male tapered surface 28' of first inner coupler 18' of a second hose segment 10' when two inner hose assemblies 12 are mated together in series.

Figure 8:
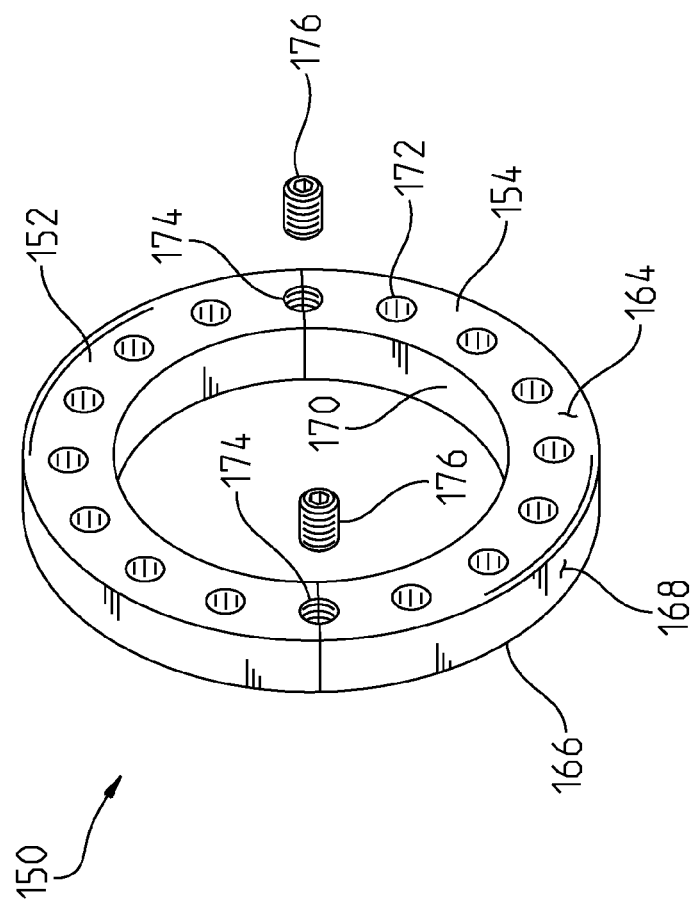
FIG. 8 is a perspective view of the split spacer member and fasteners.

Split spacer member 150 is formed from a split spacer first member 152 and a split spacer second member 154 which together are ring-shaped as defined by a first face 164 and a second face 166 separated by an outer rim 168 and an inner rim 170 as shown in FIG. 8. Split spacer member 150 circumscribes first male coupler 22 with inner rim 170 contacting recess 38 of first male couple 22 and with first face 164 abutting shoulder 36 of first male couple 22. Bore 102 of first outer coupler 84 contacts split spacer member 150 at outer rim 168 and second face 166 of the split spacer member abutting shoulder 100. In this way split spacer member 150 restricts axial movement of first inner hose connector 18 relative first outer hose connector 78 at least by contacting recess 38 and bore 102. Similarly, split spacer member 150 restricts radial movement of first inner hose connector 18 relative first outer hose connector 78 at least by contacting shoulder 36 and shoulder 100.

As described herein, spacer member 148 is described as nested between second inner hose connector 20 and second outer hose connector 80. Likewise, split spacer member 150 is described as being nested between first inner hose connector 18 and first outer hose connector 78. It is understood that spacer members 148, 150 are interchangeable with one another such that one is associated with the "first" hose assemblies and one is associated with the "second" hose assemblies. As will become apparent in the discussion related to assembly, in the preferred embodiment at least one spacer member is a split spacer member 150 to aid in the assembly process.

In one embodiment, each of spacer members 148, 150 include one or more axial apertures 172 formed through each of the spacer members extending between the respective first face 156, 164 to the respective second face 158, 166 which allow fluid to pass through the spacer member. Preferably, each of spacer members 148, 150 includes a plurality of apertures 172 spaced around the spacer member, such as is shown in FIG. 8 for split spacer member 150. In an alternative embodiment, one or both spacer members 148, 150 omit apertures 172 and serve as partitions within containment area 16 to prevent fluid from passing the respective spacer member. In a further embodiment, spacer members 148, 150 include a bore 174 for accepting a set screw 176. Bore 174 may be formed in the place of one of apertures 172, or as a specially configured bore in addition to apertures 172. Set screw 176 is a fastener which secures spacer member 148, 150 in place relative to inner hose assembly 12 and outer hose assembly 14. In one embodiment, set screw 176 is tapered such that bore 174 flexes outwardly as set screw 176 is advanced into the bore and causes a compression fit between one of spacer members 148, 150 and inner hose assembly 12 and outer hose assembly 14. In the preferred embodiment, bore 174 is formed at the interface between split spacer first member 152 and split spacer second member 154, as shown in FIG. 8. In this embodiment, as set screw 176 is advanced into bore 174, split spacer first member 152 and split spacer second member 154 are urged apart from one another and into compressive contact with outer hose assembly 14, thereby anchoring split spacer member 150 in place.

In practice, the hose-in-hose segment 10 of the present disclosure will be used in series with multiple hose-in-hose segments to form an extended pipeline, hose-in-hose system 8. In this way, hose segments 10 of relatively short lengths can be joined together into a series of coupler-hose-coupler segments to form a pipeline of the desired length. Also, by segmenting the pipeline, if a rupture occurs in one part of the pipeline, repair can be done by mending or replacing a single segment or component part thereof, while leaving the other segments intact. As such, the junction between a first hose-in-hose segment 10 and a second hose-in-hose segment 10' is illustrated in FIGS. 1 and 2.

Figure 2:
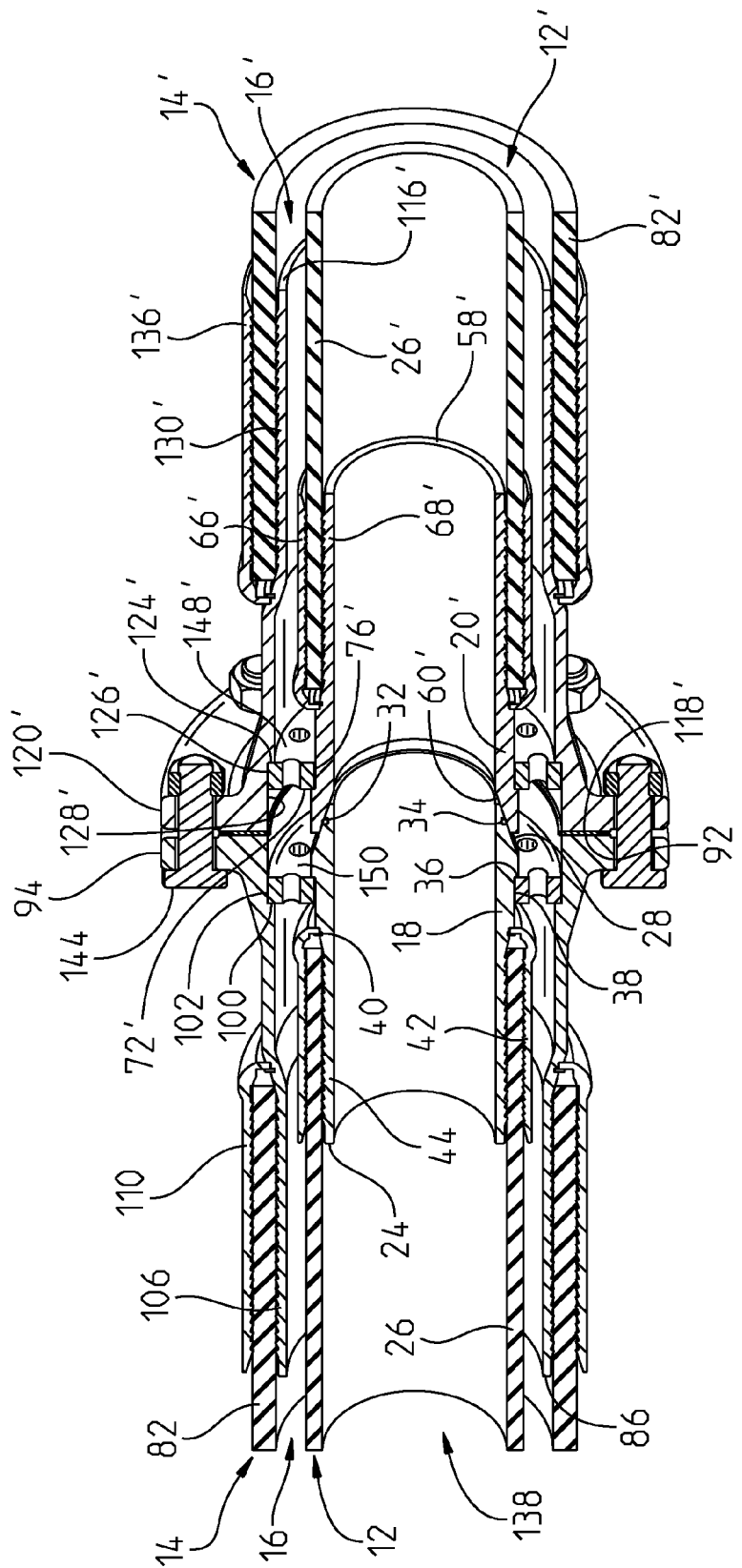
FIG. 2 is a cross-sectional view of the hose-in-hose assemblies shown in FIG. 1 as cut along line 2-2.
Figure 3:
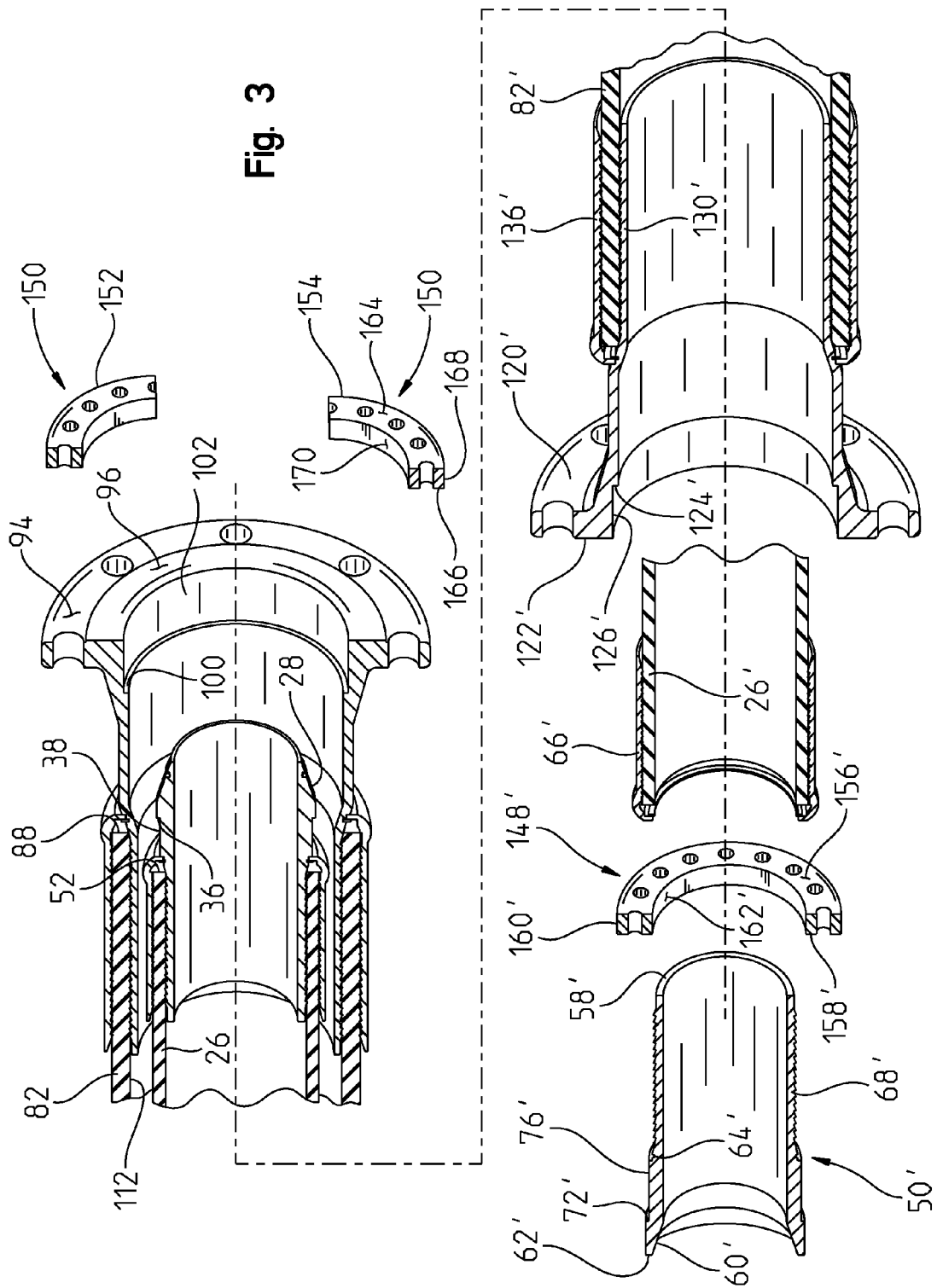
FIG. 3 is an exploded view of a hose-in-hose assembly.
Figure 4:
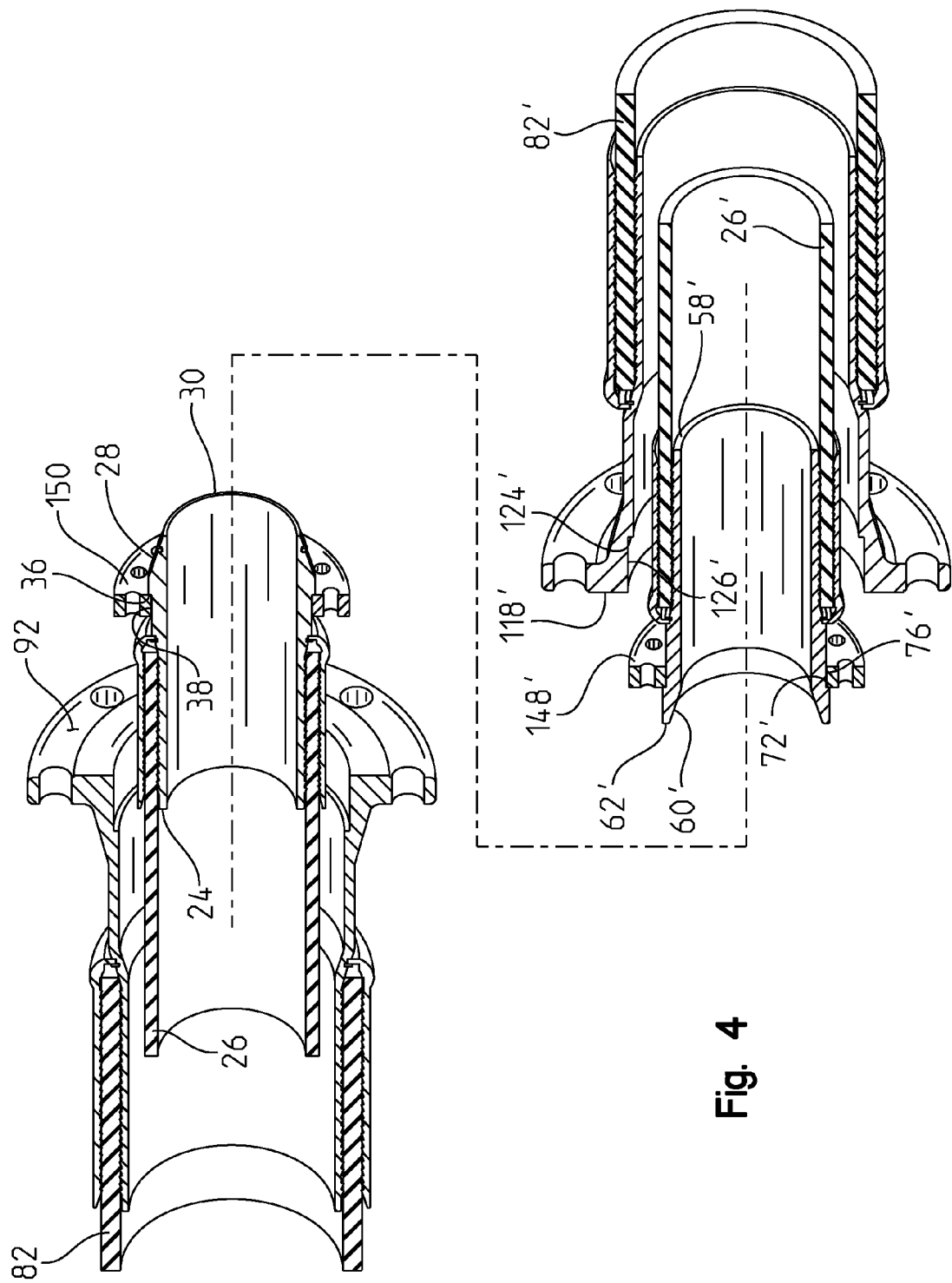
FIG. 4 is a view of the mating relationship between two hose-in-hose assemblies.
Figure 5:
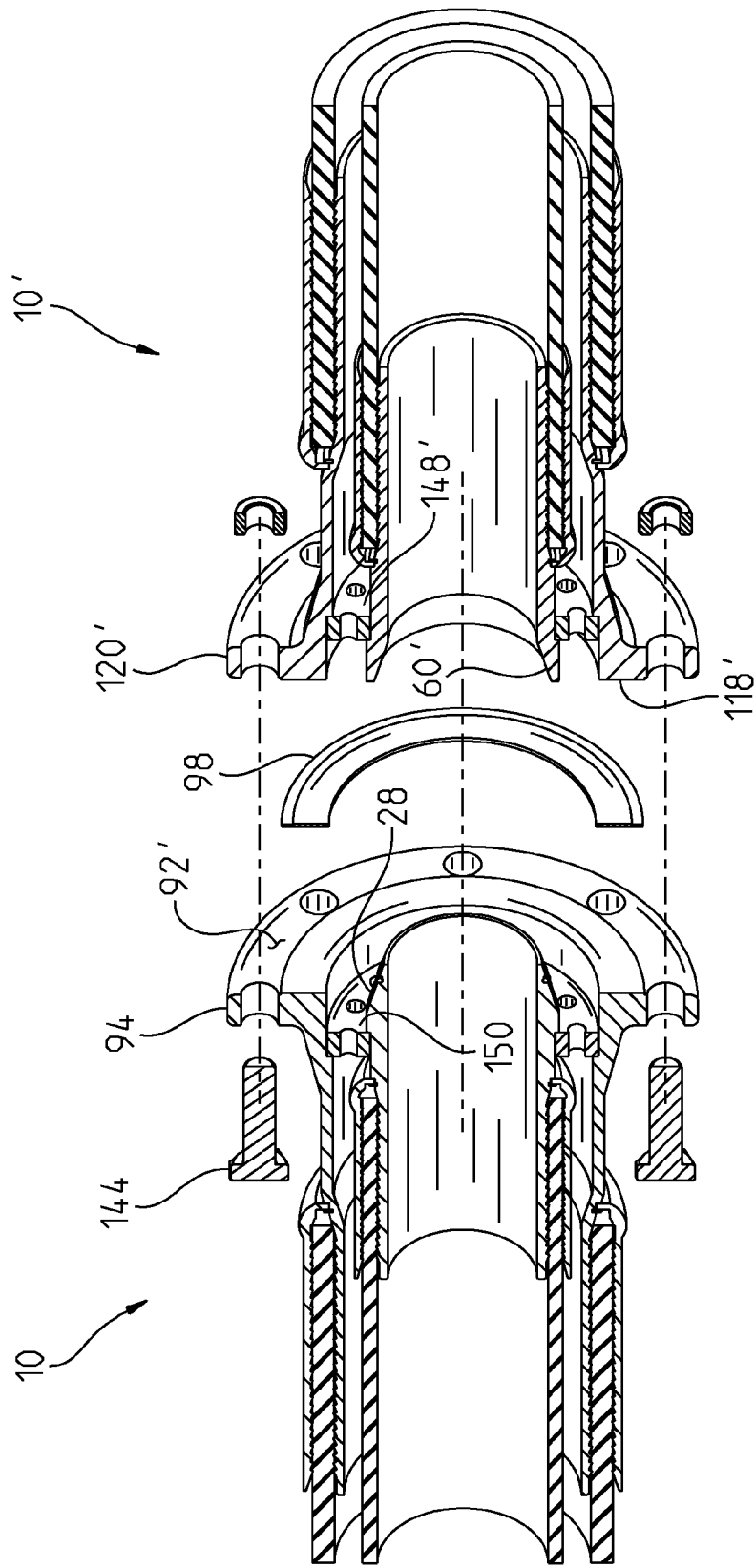
FIG. 5 is an additional view of the mating relationship between two hose-in-hose assemblies.
Figure 6:
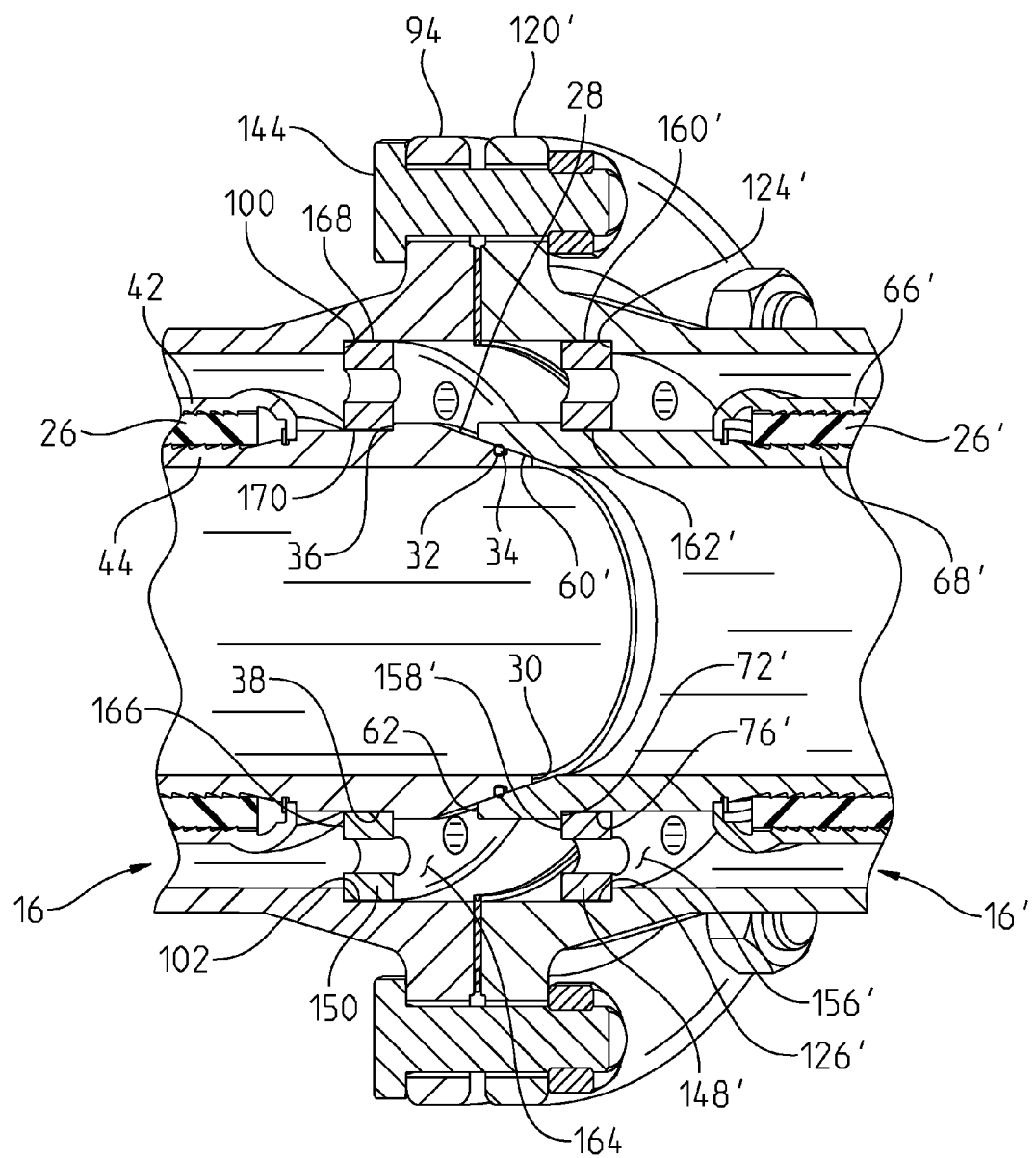
FIG. 6 is a perspective close-up view of two hose-in-hose assemblies as coupled together.

Referring to FIG. 2, a first hose-in-hose segment 10 is coupled to a second hose-in-hose segment 10'. Here, tapered outer surface 28 of first inner hose connector 18 mates against tapered inner surface 60' of second inner hose connector 20', such that a fluid-tight seal is formed therebetween. Split spacer member 150 circumscribes first inner hose connector 18 and contacts recess 38 and shoulder 36. Collar 42 and sleeve portion 44 together secure inner hose 26 to first inner hose connector 18. Spacer member 148' circumscribes second inner hose connector 20' and contacts recess 76' and shoulder 72'. Collar 66' and sleeve portion 68' together secure inner hose 26' to second inner hose connector 20'. Mating surface 92 of first outer coupler 84 mates against mating surface 118' of second outer coupler 114', such that a fluid-tight seal is formed therebetween. Mating surface 92 is held in contact with mating surface 118' by fasteners 144 which connect flange 94 to flange 120'. Split spacer member 150 nests within first outer coupler 84 and contacts shoulder 100 and spanning portion 104. Collar 110 and sleeve portion 106 together secure outer hose 82 to first outer hose connector 78. Solid spacer member 148' nests within second outer coupler 80' and contacts shoulder 124' and spanning portion 128'. Collar 136' and sleeve portion 116' together secure outer hose 82' to second outer hose connector 80'. Spacer members 148', 150 serve to maintain the axial and radial positioning of inner hose assemblies 12, 12' relative outer hose assemblies 14, 14'. Specifically, spacer members 148', 150 brace against the respective outer hose connector 78, 80' and the respective inner hose connector 18, 20' such that a fluid-tight fit is formed between tapered outer surface 28 of first inner hose connector 18 and tapered inner surface 60' of second inner hose connector 20'. The use of spacer members 148', 150 allows inner hose assemblies 12, 12' to be properly oriented within outer hose assemblies 14, 14' simply by positioning the spacer members in the proper location, and then fastening flanges 94, 120' with fasteners 144. Assembly in this way is a significant improvement over the prior art which typically required separate positioning and fastening of the inner hose assembly prior to positioning and fastening of the outer hose assembly. The hose-in-hose system 8 of the present invention uses external fasteners to secure both the internal seal between inner hose couplers 22, 50' and the external seal between outer connectors 78, 80'. Thus, when the flanges 94 and 120' are bolted together a user of the hose-in-hose system 8 can be assured that a fluid tight connection will be made between outer tapered surface 28 of first male coupler 22 and the tapered inner surface 60' on the second female coupler 50'. O-ring will ensure a fluid-tight connection should there be any imperfections in the tapered surfaces 28 and 60'. The O-ring 34 will also accommodate small tolerance variations within the hose-in-hose system 8. As such, the present disclosure is a significant improvement over the prior art as inner hose couplers 22, 50' are sealably mated together without the use of separate fasteners on the inner hose couplers; the only fasteners needed to ensure proper sealing of both the inner and outer couplers are the fasteners holding the outer flanges 94, 120' in sealed contact with one another.

Figure 7A:
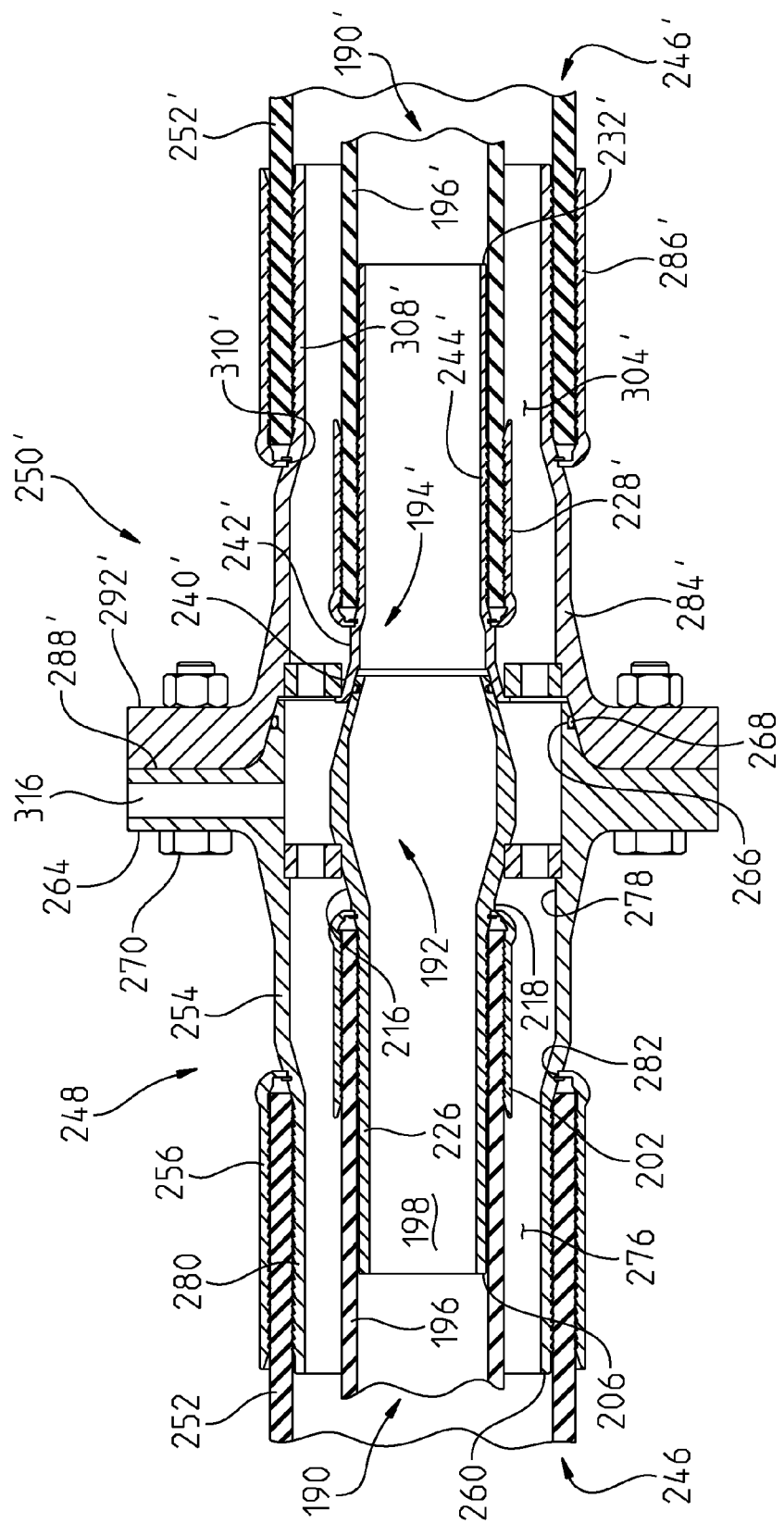
FIG. 7A is a cross-sectional side view of an alternative embodiment of the hose-in-hose assembly.
Figure 7B:
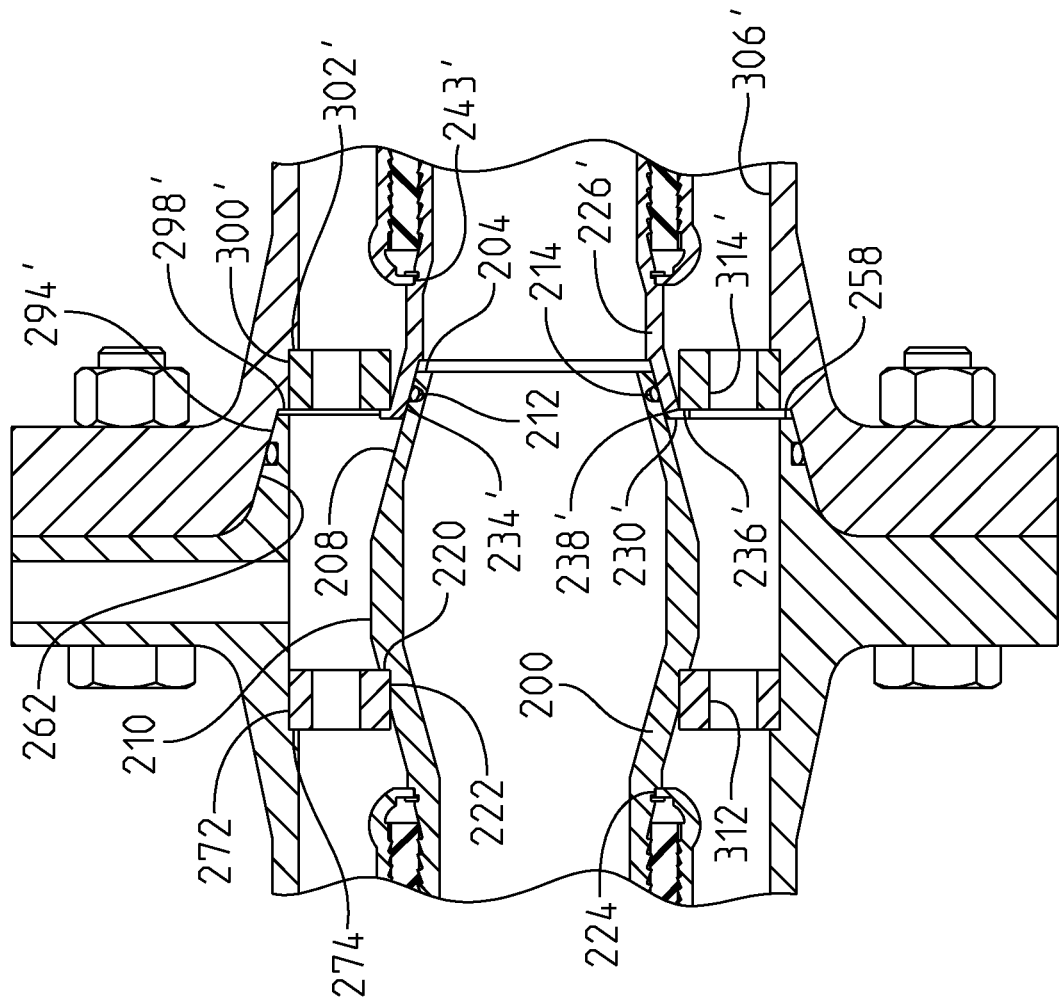
FIG. 7B is a close-up view of a portion of the embodiment shown in FIG. 7A.

Referring now to FIGS. 7A and 7B, in a further embodiment, an inner hose assembly 190 is formed from a first inner hose connector 192, a second inner hose connector 194, and a first inner hose 196 joining first inner hose connector 192 and second inner hose connector 194'. As shown in FIGS. 7A and 7B, a first inner hose assembly 190 is coupled to a second inner hose assembly 190', similar to the described above embodiment shown in FIG. 2. First inner hose connector 192, second inner hose connector 194' and inner hose 196 are tubular in nature and define an inner chamber 198 of inner hose assembly 190. Inner chamber 198 is generally hollow and suitable for transporting a fluid through inner hose assembly 190. In the embodiment shown in FIGS. 7A and 7B, first inner hose connector 192 includes a first male coupler 200 and a collar 202. First male coupler 200 is a generally cylindrical member extending the length of first inner hose connector 192 between two ends: a terminal end 204 and a ferruled end 206. Beginning at terminal end 204, first male coupler 200 is defined by a tapered outer surface 208 which extends from terminal end 204 to a flat portion 210. Tapered outer surface 208 includes a minimum outer diameter at terminal end 204 and increases in diameter to flat portion 210. Tapered outer surface 208 of first male coupler 200 includes a groove 212 circumscribing tapered outer surface 208. Inner groove 212 carries an O-ring 214. Flat portion 210 has a substantially uniform outer diameter which circumscribes first male coupler 200. Flat portion 210 extends from tapered outer surface 208 to a second tapered surface 216. Second tapered surface includes a maximum outer diameter at flat portion 210 and decreases in diameter to a second flat portion 218. A shoulder 220 and a recess 222 form a stepped cut-out in second tapered surface 216 with shoulder 220 and recess 222 in a generally perpendicular relationship with one another where shoulder 220 is oriented perpendicularly relative to a central axis 318 of first male coupler 200. Shoulder 220 extends between flat portion 210 and a recess 222. Second flat portion 218 is defined on one end by second tapered surface 216 and on another end by a notch 224. Notch 224 is an annular recess or groove circumscribing first male coupler 200. A sleeve portion 226 extends from notch 224 to ferruled end 206. Collar 202 is cylindrically shaped and is adapted for being crimped over sleeve portion 226 of the first male coupler 200.

In the embodiment shown in FIGS. 7A and 7B, a second inner hose connector 194' of a second inner hose assembly 190' is mated with the first inner hose connector 192 of a first inner hose assembly 190. Second inner hose connector 194' includes a female coupler 226' and a collar 228'. Female coupler 226' is a generally cylindrical member extending the length of second inner hose connector 194' between two ends: a terminal end 230' and a ferruled end 232'. Beginning at terminal end 230', female coupler 226' is defined by a tapered inner surface 234' which is formed facing inner chamber 198' and extends from terminal end 230' toward ferruled end 232'. Tapered inner surface 234' of female coupler 226' is shaped to mate with tapered outer surface 208 of first male coupler 200, such that a fluid-tight seal is formed therebetween, such seal aided by contact between O-ring 214 and tapered inner surface 234'. Tapered inner surface 234' includes a maximum outer diameter at terminal end 230' and increases in diameter in the direction of ferruled end 232'. Terminal end 230' also includes an outwardly extending flange 236' which extends perpendicularly relative a central axis 318 through female coupler 226. A corner 238' is formed where flange 236' and a tapered outer surface 240' meet. Tapered outer surface 240' is the outer surface of female coupler 226' which follows the same angle as tapered inner surface 234'. A flat portion 242' is defined as a portion of female coupler 226' having a substantially uniform outer diameter and extending from tapered outer surface 240' to a notch 243'. Notch 243' is an annular recess or groove circumscribing female coupler 226'. A sleeve portion 244' extends from notch 243' to ferruled end 232'. Notch 243' is adapted for receiving collar 228'. Collar 228' is cylindrically shaped and is adapted for being crimped over sleeve portion 244' of the female coupler 226' for retaining inner hose 196'.

Referring now to FIGS. 7A and 7B, an outer hose assembly 246 is formed from a first outer hose connector 248, a second outer hose connector 250', and an outer hose 252 joining first outer hose connector 248 and second outer hose connector 250'. As shown in FIGS. 7A and 7B, a first outer hose assembly 246 is coupled to a second outer hose assembly 246', similar to as is described above for the embodiment shown in FIG. 2. Outer hose assembly 246 is formed from a first outer hose connector 248, a second outer hose connector 250', and a first outer hose 252 joining first outer hose connector 248 and second outer hose connector 250'. In the embodiment shown in FIGS. 7A and 7B, first outer hose connector 248 includes a first outer coupler 254 and a collar 256. First outer coupler 254 is a generally cylindrical member extending the length of first outer hose connector 248 between two ends: a terminal end 258 and a ferruled end 260. Beginning at terminal end 258, first outer coupler 254 is defined by a male chamfered surface 262. Male chamfered surface terminates at a flange 264 which extends perpendicularly from first outer coupler 254 relative a central axis 318 through outer hose assembly 246. Male chamfered surface 262 of first outer coupler 254 may include a groove 266 suitable for accepting an O-ring 268. One or more apertures 266 (not shown) pierce male flange 264 proximate the outer edge of flange 264 for accepting a fastener 270. A bore 272 extends from terminal end 258 to a shoulder 274 which together define a portion of an inner chamber 276 of first outer hose connector 248. Bore 272 has a substantially uniform inner diameter. Shoulder 274 defines a stepped change of the inner diameter of first outer hose connector 248 and extends between bore 272 and a spanning portion 278. Shoulder 274 extends perpendicularly to a central axis 318 through first outer hose connector 248. Spanning portion 278 extends between shoulder 274 and a sleeve portion 280. Sleeve portion 280 extends from spanning portion 278 on one end to ferruled end 260 on the other end. A notch 282 is formed in the outer surface of first outer coupler 254. Notch 282 is an annular recess or groove circumscribing first outer coupler 254 and is positioned on the outer surface of first outer coupler 254 near where sleeve portion 280 joins spanning portion 278. Notch 282 is adapted for receiving collar 256.

In the embodiment shown in FIGS. 7A and 7B, second outer hose connector 250' includes a second outer coupler 284' and a collar 286'. Second outer coupler 284' is a generally cylindrical member extending the length of second outer hose connector 250' between two ends: a mating surface 288' and a ferruled end 290'. Beginning at mating surface 288', second outer coupler 284' is defined by an outwardly extending flange 292' which extends perpendicularly from second outer coupler 284' relative a central axis 318 of second outer coupler 284'. Mating surface 288' is defined as the leading surface of flange 292' and makes mating contact with flange 292' of first outer hose connector 248 as shown in FIGS. 7A and 7B. A female chamfered surface 294' forms a portion of mating surface 288' and defines a portion of the interior of second outer coupler 284'. Female chamfered surface 294' is shaped to mate with male chamfered surface 262, such that a fluid-tight seal is formed between first outer hose connector 248 and second outer hose connector 250', such seal is aided by O-ring 268. Apertures 296' (not shown) pierce flange 292' proximate the outer edge of flange 292' for accepting fastener 270. A seat 298' extends perpendicularly from one end of female chamfered surface 294' and is sized to accept terminal end 258 of first outer hose connector 248. Seat 298' is oriented perpendicularly relative an axis passing through second outer hose connector 250'. A bore 300' extends from seat 298' to a shoulder 302' which together define a portion of an inner chamber 304' of second outer hose connector 250'. Bore 300' has a substantially uniform inner diameter. Shoulder 302' defines a stepped change of the inner diameter of second outer hose connector 250' and extends between bore 300' and a spanning portion 306'. Shoulder 302' extends perpendicularly to a central axis 318 through second outer hose connector 250'. Spanning portion 306' extends between counter bore 302' and a sleeve portion 308'. Sleeve portion 308' extends from spanning portion 306' on one end to ferruled end 290' on the other end. A notch 310' is formed in the outer surface of second outer coupler 284'. Notch 310' is an annular recess or groove circumscribing second outer coupler 284' and is positioned on the outer surface of second outer coupler 284' near where sleeve portion 308' joins spanning portion 306'. Notch 310' is adapted for receiving collar 286'.

As with the other embodiments described herein, first inner hose connector 192, second inner hose connector 194', first outer hose connector 248 and second outer hose connector 250' are held in a fixed axial and radial configuration one with another by a solid spacer member 312 and a split spacer member 314'. Solid spacer member 312 is nested around first inner hose connector 192 such that solid spacer member 312 contacts shoulder 220 and recess 222 of first inner hose connector 192. Solid spacer member 312 is nested within first outer hose connector 248 such that solid spacer member 312 contacts shoulder 274 and bore 272 of first outer hose connector 248. In this way, solid spacer member 312 holds first inner hose connector 192 and first outer hose connector 248 in a fixed axial and radial relationship with one another. Split spacer member 314' is nested around second inner hose connector 194' such that split spacer member 314' contacts corner 238' of second inner hose connector 194'. Split spacer member 314' is nested within second outer hose connector 250' such that split spacer member 314' contacts shoulder 302' and bore 300' of second outer hose connector 250'. In this way, split spacer member 314' holds second inner hose connector 194' and second outer hose connector 250' in a fixed axial and radial relationship with one another. Additionally, with first outer hose connecter 248 fastened to second outer hose connector 250', first inner hose connector 192 will be in mating contact with second inner hose connector 194' which will further restrict movement of the parts relative one another.

In any of the above-described embodiments, one or both of the flanges of the outer hose assembly includes a channel 316, as shown in FIGS. 7A and 7B, providing access to containment area 16. Channel 316 may serve a number of functions, such as allowing a fluid path to or from containment area 16, or providing access for a probe, such as a moisture, temperature, pressure or other sensor to containment area 16.

Central axis 318 is shown in FIG. 1. Central axis 318 extends longitudinally through the center of hose-in-hose system 8. As described herein, many of the structures of hose-in-hose system 8 are parts of revolution which are symmetrical as rotated about central axis 318. While such rotational symmetry of hose-in-hose system 8 is preferred, it is understood that hose-in-hose system 8 could have other cross-sections and still perform as described herein.

One segment of inner hose assembly 12 is assembled according to the following steps:
  a) Sliding a solid spacer member 148 onto a second inner hose connector 20 such that the spacer member contacts a second inner shoulder 72;
  b) Crimping a second inner collar 66 to the second inner hose connector 20 at second inner notch 64;
  c) Joining a second end 54 of an inner hose 26 to second inner hose connector 20 by crimping inner hose 26 between second inner collar 66 and a second inner sleeve 68;
  d) Crimping a first inner collar 42 to a first inner hose connector 18 at first inner notch 40;
  e) Joining a first end 52 of inner hose 26 to first inner hose connector 18 by crimping inner hose 26 between first inner collar 42 and a first inner sleeve 44;

It is noted that steps a)-e) above could be performed out of order, for example first inner hose connector 18 could be assembled (according to steps d)-e)) prior to the assembly of second inner hose connector 20 (according to steps a)-c)).

One segment of outer hose assembly 14 is assembled according to the following steps:
  i) Crimping a first outer collar 110 to a first outer hose connector 78 at a first outer notch 108;
  ii) Joining a first end 88 of an outer hose 82 to first outer hose connector 78 by crimping outer hose 82 between first outer collar 110 and a first outer sleeve 106;
  iii) Crimping a second outer collar 136 to a second outer hose connector 80 at a second outer notch 132;
  iv) Joining a second end 90 of outer hose 82 to second outer hose connector 80 by crimping outer hose 82 between second outer collar 136 and a second outer sleeve 130;

It is noted that steps i)-iv) above could be performed out of order, for example first outer hose connector 78 could be assembled (according to steps i)-ii)) subsequent to the assembly of second outer hose connector 80 (according to steps iii)-iv)).

One segment 10 of the hose-in-hose system 8 of the present disclosure is assembled from an inner hose assembly 12 (such as is assembled according to steps a)-e) above) and an outer hose assembly 14 (such as is assembled according to steps i)-iv) above) according to the following steps:
  a) Threading first inner hose connector 18 of inner hose assembly 12 through the interior of first outer hose assembly 14 toward the second outer hose connector 80 until a first face 156 of solid spacer member 148 rests against first shoulder 100 of the first outer hose assembly and a second face 158 of the solid spacer member contacts second inner shoulder 72 of second inner hose connector 20;
  b) Stretching inner hose 26 to draw first inner hose connector 20 beyond shoulder 124 of the second outer hose connector 80;
  c) Nesting a second face 166 of each of split spacer first member 152 and split spacer second member 154 of a split spacer member 150 against first inner shoulder 36 of first inner hose connector 20;
  d) Retracting inner hose 26 into second outer hose connector 80 until a first face 164 of each split spacer members 150 contacts second shoulder 124 of the second outer hose assembly;
  e) Anchoring split spacer member 150 with a set screw 176 threaded into a bore 174.

At the completion of step 4), the two spacer members 148, 150 are simultaneously seated (or nested) against their respective shoulders (each spacer member is seated between a shoulder on the inner assembly and a shoulder on the outer assembly), such that inner hose assembly 12 is held in a fixed axial position relative outer hose assembly 14.

It is noted that steps 1)-5) can be modified such that inner hose assembly 12 is threaded with second inner hose connector 20 as the leading end. In other words, segment 10 can be assembled with the male end of inner hose assembly 12 at either end relative outer hose assembly 14. As used herein, threaded, when referring to threading first inner hose assembly 12 through outer hose assembly 14, is defined as passing the inner hose assembly through the outer hose assembly (as in threading a needle).

The hose-in-hose segment 10 assembled according to steps 1)-5) above can then be joined in series with additional segments to form a pipeline by mating the male end of one segment with the female end of another segment and fastening the segments together at the outer flanged ends with one or more fastener 144 to construct hose-in-hose system 8 of a desired length. It should also be appreciated that step a)-n) above can be replicated to construct one segment of the embodiment shown in FIGS. 7A and 7B.

Step d), described above, describes use of split spacer member 150 as part of assembling hose-in-hose segment 10. When hose 26 is stretched, each half of split spacer member 150 is positioned around first inner hose connector 20. Using a spacer member formed from two parts allows assembly without needing to remove connector 20—spacer member 150 has an opening which is too narrow to allow connector 20 to pass through. In this way, inner hose assembly 12 can be preassembled with all necessary components except split spacer member 150, and then inner hose assembly 12 can be retained within outer hose assembly 14 by adding split spacer member 150 as described above. In this way, split spacer member 150 provides ease of assembly which is a significant improvement over the prior art.

This invention is not limited to the details above, but may be modified within the scope of the following claims.

What is claimed is:

1. A hose-in-hose system comprising:
   a first inner coupler defined on one end by a male tapered mating surface; said first inner coupler having a first shoulder spaced away from said male tapered mating surface; said first shoulder oriented substantially perpendicular relative a central axis through said first inner coupler; a first recess extending from said first shoulder away from said male tapered mating surface;
   a second inner coupler defined on one end by a female tapered mating surface; said female tapered mating surface shaped to mate with said male tapered mating surface; said second inner coupler having a second shoulder oriented substantially perpendicular relative a central axis of said second inner coupler; a second recess extending from said second shoulder away from said female tapered mating surface;

a first outer coupler having a first outer flange extending perpendicularly relative to a central axis of said first outer coupler, said first outer flange defined on one side by a first mating surface, said first outer coupler having a first bore extending from said first mating surface and defining a portion of an interior of said first outer coupler, said first bore terminating in a first shoulder extending toward said central axis of said first outer coupler and spaced away from said first mating surface, said first mating surface annularly extending outwardly of said first bore; said first shoulder of said first outer hose coupler oriented substantially perpendicular relative to said central axis of said first outer coupler;

a second outer coupler having a second outer flange extending perpendicularly relative to a central axis of said second outer coupler, said second outer flange defined on one side by a second mating surface, said second mating surface adapted to mate with said first mating surface said second outer coupler having a second bore extending from said second mating surface defining a portion of an interior of said second outer coupler, said second bore terminating in a second shoulder extending toward said central axis of said second outer coupler and spaced away from said second mating surface, said second mating surface annularly extending outwardly of said second bore; said second shoulder of said second outer coupler oriented substantially perpendicular relative to said central axis of said second outer coupler;

a first containment area defined by the space between said first inner hose coupler and said first outer hose coupler;

a second containment area defined by the space between said second inner hose coupler and said second outer hose coupler;

a first spacer member is ring-shaped having a first face and a second face separated by an outer rim and an inner rim; said first spacer member nested in said first containment area between said first inner coupler and said first outer coupler; said first face of said first spacer member contacting said first shoulder of said first inner coupler, said second face of said first spacer member contacting said first shoulder of said first outer coupler, said first spacer locating said first shoulder of said first inner coupler nearer said first mating surface of said first outer coupler than said shoulder of said first shoulder of said first outer coupler, said outer rim contacting said first bore of said first outer hose coupler, said inner rim contacting said first recess of said first inner coupler;

a second spacer member is ring-shaped having a first face and a second face separated by an outer rim and an inner rim; said second spacer nested in said second containment area between said second inner coupler and said second outer coupler; said first face of said second spacer member contacting said second shoulder of said second inner coupler, said second face of said second spacer member contacting said second shoulder of said second outer coupler, said second spacer locating said second shoulder of said second inner coupler nearer said second mating surface of said second outer coupler than said second shoulder of said second outer coupler, said outer rim contacting said second bore of said second outer hose coupler, said inner rim contacting said second recess of said second inner coupler; said male tapered mating surface held in sealed contact with said female tapered mating surface when said first and second outer mating surfaces are held in contact.

2. The hose-in-hose system of claim 1, having a first aperture passing through said first outer flange, said first aperture being spaced radially outward of first bore in said first coupler and a second aperture passing through said second outer flange, said second aperture being spaced radially outward of said second bore in said second coupler, when said first mating surface and said second mating surface are mated together said first aperture and said second aperture are adapted for alignment along a common axis so that a fastener may be received through said first and second apertures for holding said first and second mating surfaces together, said first bore in said first outer coupler being substantially the same diameter for its entire length, said second bore in said second outer coupler being substantially the same diameter for its entire length.

3. The hose-in-hose system of claim 2, and an aperture formed in said first spacer member between said inner and outer rim and extending from said first face to said second face, and an aperture formed in said second spacer member between said inner and outer rim extending from said first face to said second face, said apertures of said first and second spacer members allowing fluid communication between said first containment area and said second containment area.

4. The hose-in-hose system of claim 3, wherein one of said first or second spacer members is formed from a first split spacer member and a second split spacer member, said first and second split spacer members are each generally semi-circular such that together they are ring-shaped.

5. The hose-in-hose system of claim 4, having a split longitudinal bore between said inner and outer rim extending in an axial direction from said first face to said second face of said one spacer member, said split longitudinal bore extending through an interface between said first split spacer member and said second split spacer member, said split longitudinal bore including a first semi-cylindrical portion contained on said first split spacer member and a second semi-cylindrical portion contained on said second said split spacer member, said split longitudinal bore adapted for receiving a fastener, said semi-cylindrical portion of said bore in said first split spacer member and said semi-cylindrical portion in said second split spacer member being complementary to form a cylindrical aperture when split spacer members are held adjacent so that their respective first and second faces are aligned to form said one spacer member.

6. The hose-in-hose system of claim 5, wherein said fastener in said split longitudinal bore wedges said first split spacer member and said second split spacer member apart and into braced contact with either said first bore of said first outer coupler or said second bore of said second outer coupler.

* * * * *